(12) United States Patent
Muerset

(10) Patent No.: US 8,225,654 B2
(45) Date of Patent: Jul. 24, 2012

(54) SELF-COMPENSATING CAPACITIVE LIQUID LEVEL DETECTOR

(75) Inventor: Peter Muerset, Milpitas, CA (US)

(73) Assignee: Tecan Trading AG, Mannedorf (CH)

( * ) Notice: Subject to any disclaimer, the term of this patent is extended or adjusted under 35 U.S.C. 154(b) by 500 days.

(21) Appl. No.: 12/496,031

(22) Filed: Jul. 1, 2009

(65) Prior Publication Data

US 2011/0000296 A1    Jan. 6, 2011

(51) Int. Cl.
    *G01F 23/26* (2006.01)
(52) U.S. Cl. ....................................... 73/304 C
(58) Field of Classification Search .................. 73/304 C
    See application file for complete search history.

(56) References Cited

U.S. PATENT DOCUMENTS

| | | | |
|---|---|---|---|
| 3,391,547 A | | 7/1968 | Kingston |
| 4,173,893 A | * | 11/1979 | Hedrick ........................ 73/304 C |
| 4,199,984 A | | 4/1980 | Huddart |
| 4,286,208 A | | 8/1981 | French et al. |
| 4,444,051 A | | 4/1984 | Yamaki et al. |
| 4,470,008 A | | 9/1984 | Kato |
| 4,530,372 A | | 7/1985 | Overton et al. |
| 4,977,786 A | | 12/1990 | Davis |
| 5,005,409 A | | 4/1991 | Hochstein |
| 5,365,783 A | | 11/1994 | Zweifel |
| 5,582,798 A | * | 12/1996 | Meltzer ........................ 422/518 |
| 5,648,727 A | * | 7/1997 | Tyberg et al. .................. 324/677 |
| 7,222,526 B2 | * | 5/2007 | Baker et al. ................... 73/304 C |
| 2003/0000303 A1 | | 1/2003 | Livingston et al. |
| 2003/0233875 A1 | | 12/2003 | Doyle |
| 2005/0092080 A1 | | 5/2005 | Harazin et al. |
| 2006/0207322 A1 | | 9/2006 | Krufka et al. |

FOREIGN PATENT DOCUMENTS

| | | |
|---|---|---|
| CN | 87216002 U | 9/1988 |
| CS | 8307475 A | 7/1991 |
| DE | 2852212 A | 6/1980 |
| DE | 3336974 | 5/1985 |
| DE | 10159336 A1 | 12/2002 |
| DE | 202005019740 U1 | 6/2006 |
| DE | 102005057558 A1 | 6/2007 |
| DE | 102007049950 A1 | 9/2008 |
| EP | 0378304 A | 7/1990 |
| JP | 57006320 A | 1/1982 |
| JP | 61129531 A | 6/1986 |
| JP | 2002-054979 A | 2/2002 |
| JP | 2003083795 A | 3/2003 |

* cited by examiner

*Primary Examiner* — Hezron E Williams
*Assistant Examiner* — Rodney T Frank
(74) *Attorney, Agent, or Firm* — Notaro, Michalos & Zaccaria P.C.

(57) ABSTRACT

Method and corresponding apparatus for liquid level detection with a liquid level detection unit (10) with a capacitive liquid level detector (14) with a input capacitance (C) changing if the capacitive liquid level detector (14) contacts a liquid, the method comprising the steps of: generating a clock signal (CLK), with a predetermined on-time (t1) corresponding to a predetermined sensitivity of the capacitive liquid level detector (14), being fed both to a reference generator (12) and to the capacitive liquid level detector (14); said reference generator (12) generating a control value (CV), derived from an on/off ratio of said clock signal (CLK) and feeding it into a control input (19) of a comparator (18); feeding a liquid detection response signal (RS), of said capacitive liquid level detector (14) in response to said clock signal (CLK), into a signal input (20) of the comparator (18); said comparator (18) triggering an output signal at an output (21) when said liquid detection response signal (RS) exceeds a threshold value (TV) in response to a change of the input capacitance (C).

16 Claims, 7 Drawing Sheets

SELF-COMPENSATING CAPACITIVE LIQUID LEVEL DETECTOR

FIELD OF THE INVENTION

The present invention relates to a method for liquid level detection and a method for multi-channel liquid level detection.

The present invention further relates to a corresponding liquid level detection unit and a multi-channel liquid level detection system comprising multiple liquid level detection units.

BACKGROUND OF THE INVENTION

Liquid level detectors are used in various fields with different purposes and different modes of operation. Liquid level detectors are particularly used in so-called pipetting channels used in laboratory liquid handling equipment, wherein even very small amounts of liquids have to be precisely detected/measured.

One particular type of liquid level detection is known as capacitive liquid level detection, wherein the presence or the level of a liquid is detected by monitoring for sudden changes of the capacitance seen between the tip and the grounded work surface, these sudden changes in capacitance occurring due to physical contact between tip and the liquid being established or interrupted.

Various circuits have been developed in order to be able to provide an output signal indicating whether a fluid is present or its level based on this change of input capacitance. One particular circuit, well established in the field, works by the principle of charging the capacitor, which includes the wanted liquid capacitance as well as the unwanted cable and filtering circuit capacitance followed by a discharge. The time needed to charge the total present capacitance at the input is converted in a pulse width modulation duty cycle proportional to the input capacitance. The following band pass filter and amplifier removes the DC component and amplifies only the voltage change resulting in a voltage pulse proportional to the capacitance change at the sensor input. If said pulse would exceed a predetermined voltage, a threshold value, an output signal would be generated. A clock signal is used to control the charge/discharge cycles. The frequency of the clock signal is directly proportional to the sensitivity of the liquid level detection. Thus altering the frequency has to be compensated either with an alteration of the threshold value or by changing the amplification gain of a signal amplifier to compensate for the amplitude change of the liquid detection input signal.

In classical applications, the clock frequency was preset and fixed in production stage for these circuits and a corresponding reference voltage and/or amplification gain was calculated and fixed so that the required sensitivity is ensured. However, certain applications require that the clock frequency is changed. As a consequence, the reference voltage and/or amplification gain has to be also changed accordingly, otherwise the sensitivity will be affected and false outputs would be generated.

One of the reasons the clock frequency has to be changed is that these capacitive Liquid Level Detectors and their control circuitry are very sensitive to interferences. Such interferences can be caused by other electronic apparatus in the proximity which operates at a similar or identical frequency as the clock signal. As with all interferences, this problem becomes worse as the distance between the two devices operating at nearby frequencies gets smaller. This is particularly the case in so-called multi-axes or multi-channel configurations of laboratory equipment, where multiple liquid level detectors are mounted on said multiple axes.

Existing designs for capacitive liquid level detection, where multiple capacitive liquid level detectors are in close proximity come along with the need to either synchronizing all capacitive liquid level detectors within a system or to set the clocking frequencies apart from each other to prevent from interference which could lead to false detection.

Synchronization of all capacitive liquid level detectors represents only an acceptable solution if all axes are fix positioned in relation to each other. All other cases where those axes are independently positioned introduce difficulties due to wiring constraints and possible electromagnetic interference issues. For a synchronization of all capacitive liquid level detectors, an additional cross connection between them would be needed or a central clock generator to be implemented on an interconnection board or the like.

The second approach for preventing interferences, i.e. setting the frequencies apart from each other has the consequence that sensitivity will change accordingly. This could be compensated using digital signal processing or, in case of level comparators by adjusting the reference voltage and/or amplifier gain. Adjusting the reference voltage and/or amplification gain can be accomplished with different assemblies for each frequency setting by some sort of switch or jumper settings or by a programmable voltage reference. However, adjustment of the amplification gain has the disadvantage that it is highly dependent on the accuracy and linearity of the amplifier in all amplifying domains. All these solutions add cost and/or risk of wrong sensitivity settings leading to potential misleading results without error visibility.

Objective of the Invention

Thus, the objective of the present invention is to provide a method for liquid level detection which is able to provide a reliable output signal indicting the presence of a liquid, said method being insensitive to changes in the clock frequency, said method requiring neither additional digital signal processing nor individual setting of the reference voltage and/or amplification gaining respect of each frequency change but at the same time allowing frequency independent sensitivity adjustments.

A further objective of the present invention is to provide a method for multi-channel liquid detection wherein interferences between said multiple channels are prevented, said method requiring neither additional digital signal processing nor individual setting of the reference voltage and/or amplification gaining respect of each frequency change.

An even further objective of the present invention is to provide a liquid level detection unit for capacitive liquid level detection which is capable of providing a reliable output signal indicting the presence of a liquid, and which is insensitive to changes in the clock frequency but at the same time maintains a preset sensitivity, without the need for neither additional digital signal processing nor individual setting of the reference voltage and/or amplification gaining respect of each frequency change.

An even further objective of the present invention is to provide a multi-channel liquid level detection system, wherein interferences between multiple liquid level detection units are prevented and wherein the sensitivity of each channel can be individually set, said sensitivity not being affected by frequency changes.

SUMMARY OF THE INVENTION

The above identified objectives of the present invention are achieved by a method for liquid level detection with a liquid level detection unit with a capacitive liquid level detector with an input capacitance, said input capacitance changing if at least a portion of the capacitive liquid level detector contacts a liquid, the method comprising the steps:

generation of a clock signal with a preset on-time corresponding to a preset sensitivity of the capacitive liquid level detector;

feeding said clock signal both to a reference generator and to a capacitive liquid level detector input of said capacitive liquid level detector;

said reference generator generating a control value, derived from an on/off ratio of said clock signal and feeding said control value into a control input of a comparator ;

feeding a liquid detection input signal, of said capacitive liquid level detector in response to said change of the input capacitance, into a signal input of the comparator;

said control value determining a control parameter of the comparator;

said comparator triggering an output signal at an output when said liquid detection input signal of the capacitive liquid level detector exceeds a threshold value in response to a change of the input capacitance of said capacitive liquid level detector.

Further objectives of the present invention are achieved by the above-identified method characterized in that multiple liquid level detection units are mounted in relative proximity, wherein in order to prevent interferences between liquid level detection units, each liquid level detection unit is fed with a clock signal of a different frequency, each clock signal having a preset on time corresponding to a preset sensitivity of the respective capacitive liquid level detector, and wherein variations in the sensitivity of the capacitive liquid level detectors of each liquid level detection unit caused by differences in the clock signal frequencies are self-compensated by feeding each comparator of each liquid level detection unit with different control values generated by the reference generator of each liquid level detection unit based on said different clock signals.

The above identified objectives of the present invention are further achieved by a liquid level detection unit for capacitive liquid level detection comprising a capacitive liquid level detector with a input capacitance and a capacitive liquid level detector input fed with a clock signal with a preset on-time corresponding to a preset sensitivity of the capacitive liquid level detector, said input capacitance changing if at least a portion of the capacitive liquid level detector contacts a liquid; further comprising a reference generator fed with the clock signal, said reference generator generating a control value, derived from an on/off ratio of said clock signal; and a comparator with a control input fed with said control value, said control value determining a control parameter of the comparator, a signal input fed with a liquid detection input signal of said capacitive liquid level detector in response to said capacitance change; said comparator triggering an output signal at an output when said liquid detection input signal of the capacitive liquid level detector exceeds said threshold value in response to a change of the input capacitance of said capacitive liquid level detector.

Further objectives of the present invention are achieved by a multi-channel liquid level detection system comprising multiple liquid level detection units characterized in that said multiple liquid level detection units are mounted in relative proximity, wherein in order to prevent interferences between liquid level detection units, each liquid level detection unit is fed with a different clock signal at different frequencies, each clock signal having a preset on time corresponding to a preset sensitivity of the respective capacitive liquid level detector, and wherein variations in the sensitivity of the capacitive liquid level detectors of each liquid level detection unit caused by differences in the clock signals are self-compensated by feeding each comparator of each liquid level detection unit with different control values generated by the reference generator of each liquid level detection unit based on said different clock signals.

In conclusion, the essence of the invention is that the reference/threshold values and/or amplification gain are determined directly by the clock frequency, in that it is directly proportional to the on/off ratio of said clock signal wherein the on-time for all clock signals is preset according to the desired sensitivity, thus the off time changes proportionally to the change of frequency, and as a result the on/off ratio of the clock signal changes accordingly, which in turn results in a threshold value and/or amplification gain proportional to the frequency change.

Advantageous Effects

The most important advantage of the present invention is that it resolves the problems existing in prior art in an elegant way, i.e. no synchronization is needed and no extra steps for sensitivity compensation are needed either. By setting the clock frequency, the sensitivity inherently adjusts itself to compensate for the frequency change. This reduces at the same time the costs, the wiring requirements and the potential for erroneous results. Thus the method and the apparatus may be used independently of environment without the need to predetermine and preset the reference/threshold values and/or amplification gainer to use additional digital signal processing or the like. A further advantage of the present invention is that the sensitivity can be individually adjusted, by changing the on-time of the clock signal, independently from the frequency, thus allowing the use in different scenarios requiring different sensitivities and in various configurations requiring various frequencies due to interference issues. Thus both parameters, the frequency and the sensitivity can be addressed with only one signal, the clock signal, and there is no need to adjust the sensitivity in order to keep it at the same level in case more than one frequency is used since this is self-compensated.

BRIEF DESCRIPTION OF THE DRAWINGS

Further characteristics and advantages of the invention will in the following be described in detail by means of the description and by making reference to the drawings. Which show.

DESCRIPTION OF PREFERRED EMBODIMENTS

Certain terms will be used in this patent application, the formulation of which should not be interpreted to be limited by the specific term chosen, but as to relate to the general concept behind the specific term.

The term "Dip-In phase" shall be used in the context of the present application to describe the period starting just before the capacitive liquid level detector contacts a liquid and ending when the capacitive liquid level detector arrives into a position where it contacts the liquid.

The term "Dip-Out phase" shall be used in the context of the present application to describe the period starting when the capacitive liquid level detector is in a position where it contacts the liquid and ends just after the capacitive liquid level detector does not contact the liquid anymore.

Liquids refer in the context of the present application to any kind of liquid whose presence and/or level is to be detected with the capacitive liquid level detector. Various foams are to be included in this category. It is to be noted that the capacitive liquid level detection according to the present invention is compatible with conductive liquids only. This includes though liquids with a very low conductivity as well.

A clock signal is, in the context of the present application, a signal with an essentially rectangular shape with high and low values corresponding to an "on-time" and an "off time" alternating in a regular sequence at a given frequency. According to the present invention, the on-time for all clock signals is preset, wherein the off time changes proportionally to the change of frequency, thus the variation of the on/off ratio of the signal. The on-time of a clock signal CLK is preset according to the desired sensitivity, thus the on-time can be set individually. Depending on the usage in certain applications the sensitivity needs to be adjusted accordingly to ensure reliable detection. Typical parameters which have an influence on the level of the capacitance change observed by the level detection unit are the conductivity of the liquid to be detected, the amount of that liquid and the shape and/or materials of the sample plate.

A pulse width modulation signal refers to a signal with an essentially rectangular shape with alternating high and low values corresponding to an "on-time" and an "off time", wherein the ratio between the on-time and off-time carries the signal data.

Liquid detection input signal refers to the signal following a change in capacitance of the capacitive liquid level detector 14.

Figure 1A:
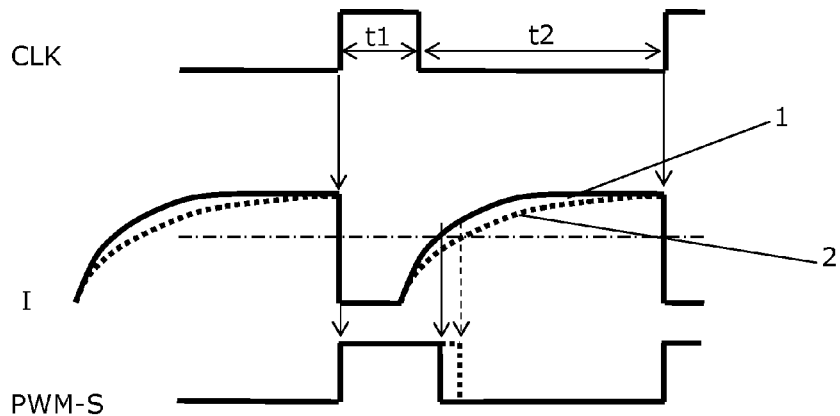
FIG. 1A Signal diagram showing the clock signal, the discharger function and the pulse width modulation signal on the same timeline.

FIG. 1A depicts a signal diagram showing the clock signal, the variance of the input capacitance C of the capacitive liquid level detector 14 and the pulse width modulation signal PWM-S on the same timeline. The clock CLK is shown above with a rectangular shape with high and low values corresponding to an "on-time" t1 and an "off time" t2 alternating in a regular sequence at a given frequency, the sum of t1 and t2 being equal to the period T of the signal. In the middle, the discharger function I is shown, which during its off-time increases, while during its on-time, it drops to approximately 0. The on-time and off-time of the discharger function I are different from the on-time and off-time of the clock signal CLK, but are synchronized with the clock signal CLK on the rising edge of the clock signal CLK. The variation 1, shown with a continuous line, corresponds to a lower input capacitance C, wherein the variation 2, shown with a dashed line, corresponds to a higher input capacitance C. The variation 2 corresponding to a higher capacitance C is rising less abruptly since a larger capacitance charges slower. According to the present invention, only the rising edge of the clock CLK is used for synchronization, i.e. the input capacitance C is discharged on the rising edge of the clock CLK. During the on-time of the discharge function I, the capacitor of the capacitive liquid level detector 14 is discharged and since the on-time of the discharge function I is fixed, the discharging time of the input capacitance C is also fixed. After completion of the discharge pulse, the capacitor of the capacitive liquid level detector 14 is discharged and a new charging cycle is started. Only the positive transition is used to trigger the fixed-time discharger pulse, therefore the on-time of the clock signal CLK does not have any impact to the discharger function. In the bottom, the duty cycle of the pulse width modulation comparator 32 is shown which directly depends on the change of input capacitance C, wherein a longer duty cycle corresponds to a higher change of input capacitance C.

Figure 1B:
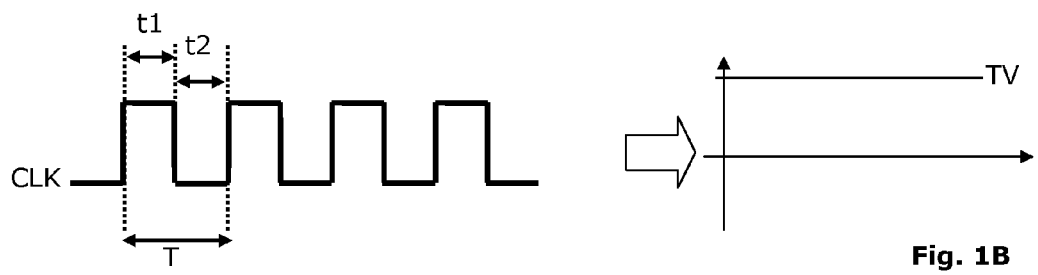
FIG. 1B Signal diagram showing the relation between the on/off ratio of the clock signal and the reference voltage, the clock signal having a first frequency.

FIG. 1B depicts a signal diagram of the clock CLK, the clock CLK having a first frequency and said clock CLK having an on-off ratio of about 1 which determines a control value CV which in turn determines a certain control parameter of the comparator 18, in the depicted embodiment, a threshold value TV shown on the graph besides.

Figure 1C:
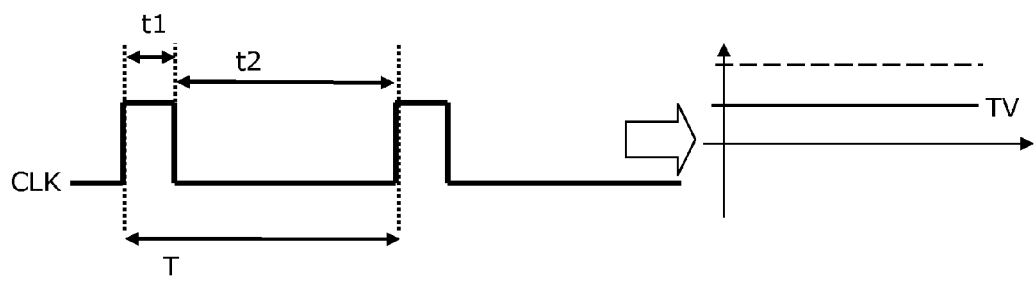
FIG. 1C Signal diagram showing the relation between the on/off ration of the clock signal and the reference voltage, the clock signal having a lower second frequency.

FIG. 1C depicts a signal diagram of the clock CLK, the clock CLK having a second frequency and said clock CLK having a different on-off ratio which determines a different control value CV, which in turn determines a different threshold value TV shown with a solid line on the graph besides as compared to the threshold value TV from FIG. 1B shown with a dashed line. Thus, according to the present invention, a lower clock CLK frequency results in a lower threshold value TV and a higher clock CLK frequency results in a higher threshold value TV. This will ensure the self-compensation of the sensitivity change of the capacitive liquid level detector 14 corresponding to clock CLK frequency changes.

Figure 1D:
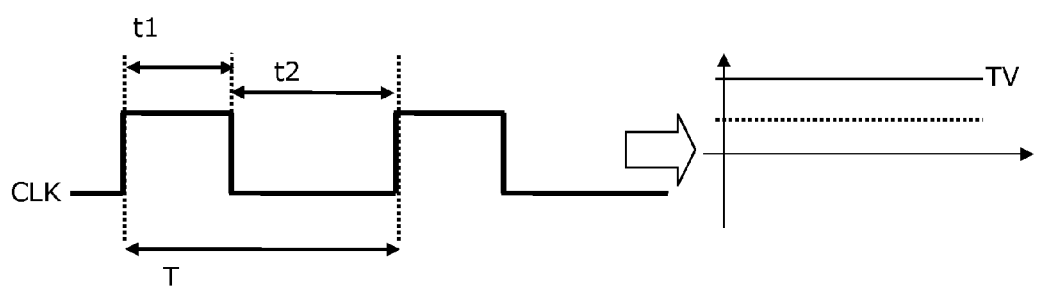
FIG. 1D Signal diagram showing the sensitivity adjustment by changing the on/off ratio of the clock signal and the reference voltage, the clock signal having the same lower second frequency but a different on-off ratio.

FIG. 1D depicts a signal diagram of the clock CLK, the clock CLK having the same second frequency as on FIG. 1 D but said clock signal CLK having a different on-off ratio which determines a different threshold value TV shown with a solid line on the graph besides as compared to the threshold value TV from FIG. 1C shown with a dotted line. Thus, according to the present invention, a higher on-off ratio of the clock signal CLK results in a higher threshold value TV. This is called sensitivity adjustment, wherein the on-time of the clock signal CLK is preset according to a desired sensitivity. It is to be noted that frequency changes will not affect the sensitivity since the on-time is kept identical to the preset on-time irrespective of frequency changes.

FIGS. 1B to 1D show a specific example of the control parameter determined based on the control value CV, that is a threshold value TV of the comparator 18. According to the present invention, the same principle can be applied to further control parameters, such as an amplification gain of the signal input 20 of the comparator 18 which determines the level of amplification applied to a signal received on said signal input 20. Thus if the sensitivity changes due to a change of the clock CLK frequency, the amplification gain will be self-compensated.

Thus by comparing FIGS. 1B and 1C the so-called "undesired" sensitivity change due to a change of frequency is apparent, said "undesired" sensitivity change being compensated by the inventive circuit of the present invention. On the other hand, by comparing FIGS. 1C and 1D the so-called "desired" sensitivity change can be noticed, wherein the on-time of the clock signal CLK at the same frequency is changed to achieve a particular desired sensitivity change.

Figure 2A:
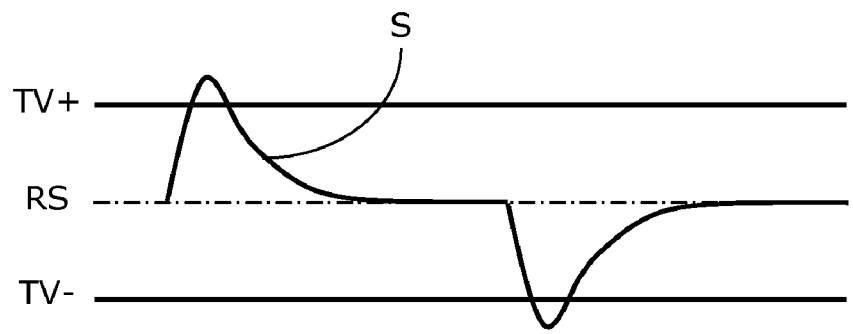
FIG. 2A Signal diagram showing the liquid detection input signal following a change of the input capacitance.
Figure 2B:
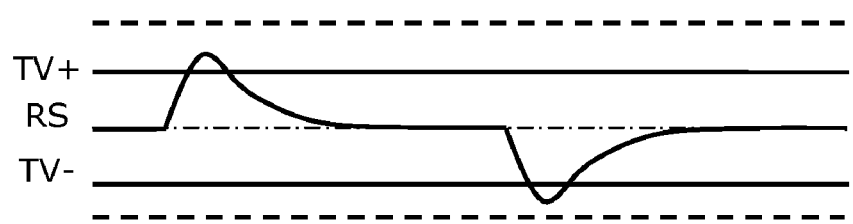
FIG. 2B Signal diagram showing a further liquid detection input signal following the same change of the input capacitance at a different clock signal frequency resulting in a different threshold value.

FIGS. 2A and 2B show the liquid detection response signal RS of the capacitive liquid level detector 14 corresponding to two different frequencies. The amplitude of the pulse in the liquid detection response signal RS shown is directly proportional to the change of input capacitance C but also to the clock CLK frequency. So, when the liquid level detector 14 has the same change of input capacitance C, the amplitude of the liquid detection response signal RS will change proportionally to the change of frequency. This will be called "undesired sensitivity change, i.e. a higher frequency will result in a higher liquid detection response signal RS amplitude and a lower frequency results in a lower amplitude (for the same change of input capacitance C).

FIG. 2A shows a signal diagram showing the liquid detection response signal RS following a capacitance increase and the positive threshold value TV+ and negative threshold value TV− corresponding to said first frequency of the clock CLK. As described in relation to FIG. 1B, the clock CLK with a first frequency corresponds to a first control value CV determining a first threshold value TV. On this figure, both the positive threshold value TV+ and the negative threshold value TV− are shown.

FIG. 2B shows a signal diagram showing the liquid detection response signal RS following the same increase of the input capacitance C as on FIG. 2A but with the second clock CLK frequency. As described in relation to FIG. 1C, the clock CLK with a second frequency corresponds to a second control value CV which determines a second threshold value TV. On this figure, both a positive threshold value TV+ and a negative threshold value TV− are shown. For comparison, the first positive threshold value TV+ and first negative threshold value TV− corresponding to the first clock CLK frequency are shown with dashed lines. On this figure, one can observe the change in sensitivity of the capacitive liquid level detector 14 which results in a proportionally lower amplitude of the liquid detection response signal RS. If it wasn't for the inventive concept according to the present invention, wherein the threshold value TV is determined by the clock CLK frequency, the liquid detection response signal RS amplitude would not exceed the first threshold value TV, shown with dashed lines, thus rendering the entire liquid level detection unit 10 unreliable.

The self-compensation of the sensitivity change of the capacitive liquid level detector 14 due to the clock CLK frequency variation is apparent from this figure, wherein the self-compensated threshold value TV is proportionally adjusted to the lower amplitude of the liquid detection response signal RS, which exceeds/falls below the positive threshold value TV+ and negative threshold value TV− respectively, thus the liquid level detection unit 10 providing a correct detection output.

Figure 2C:
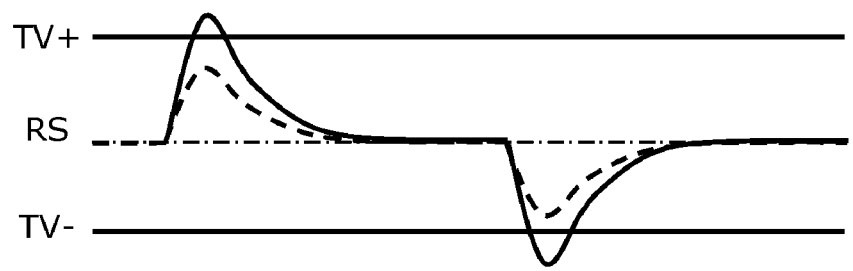
FIG. 2C Signal diagram showing a further liquid detection input signal following the same change of the input capacitance at a different clock signal frequency resulting in a different amplification gain.

FIG. 2C shows a signal diagram showing the liquid detection response signal RS following the same increase of the input capacitance C as on FIG. 2A but with the second clock CLK frequency. This figure depicts the self-compensating effect of the further control parameter, i.e. the amplification gain of the signal input 20 of the comparator 18. Assuming the clock CLK with a first frequency on FIG. 2A determined a first amplification gain, the clock CLK with a second frequency corresponds to a second control value CV which determines a second amplification gain on FIG. 2C resulting in an different amplification of the liquid detection response signal RS. For comparison, the liquid detection response signal RS with a first amplification gain corresponding to the first clock CLK frequency is shown with a dashed lines. On this figure, one can observe the change in sensitivity of the capacitive liquid level detector 14 which results in a proportionally lower amplitude of the (unamplified) liquid detection response signal RS. If it wasn't for the inventive concept according to the present invention, wherein the amplification gain is determined by the clock CLK frequency, the liquid detection response signal RS amplitude would not exceed the first threshold value TV, thus rendering the entire liquid level detection unit 10 unreliable.

The self-compensation of the sensitivity change of the capacitive liquid level detector 14 due to the clock CLK frequency variation is apparent from FIG. 2C, wherein the self-compensated amplification gain is proportionally adjusted to the lower amplitude of the (unamplified) liquid detection response signal RS, which, when the appropriate amplification gain is applied, exceeds/falls below the positive threshold value TV+ and negative threshold value TV− respectively, thus the liquid level detection unit 10 providing a correct detection output.

Figure 3:
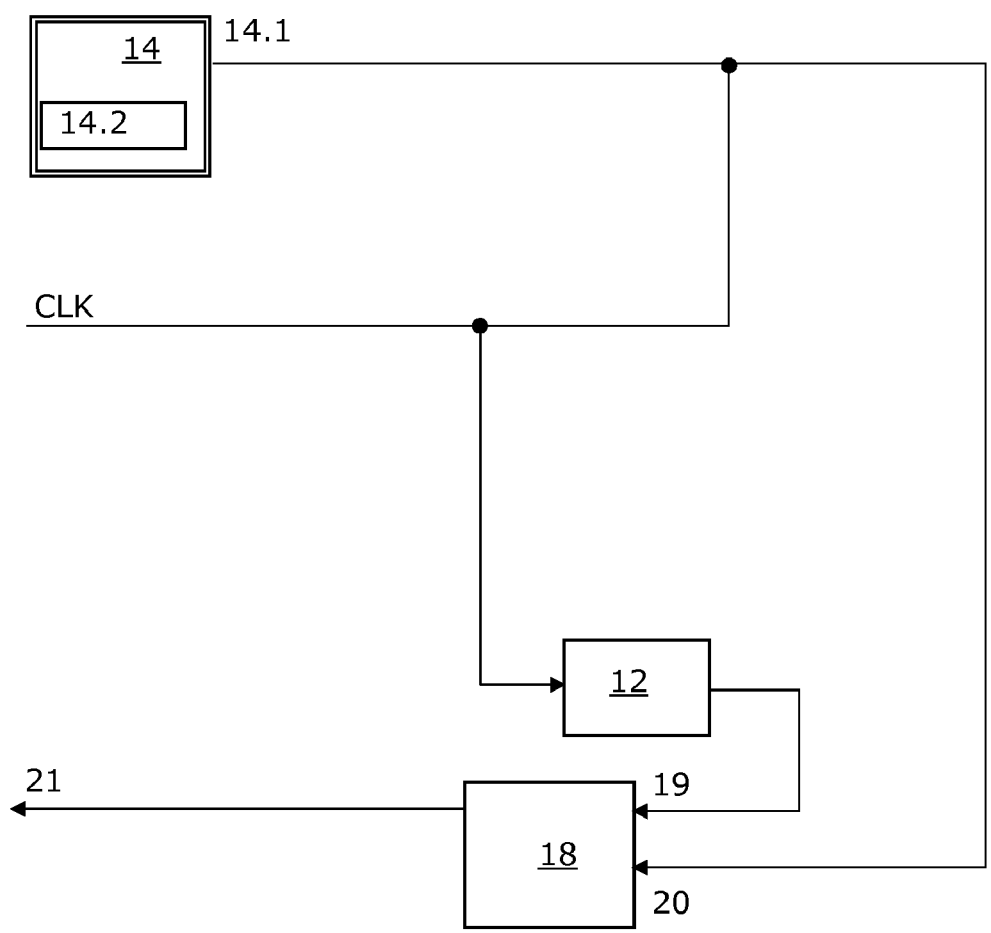
FIG. 3 Structural block diagram of a first embodiment of the liquid level detection unit according to the present invention.

FIG. 3 shows a structural block diagram of a first embodiment of a liquid level detection unit 10 according to the present invention, implementing the inventive self-compensating sensitivity concept.

The liquid level detection unit 10 for capacitive liquid level detection comprises a capacitive liquid level detector 14 in the first place. This is characterized by an input capacitance C which is measured between the capacitive liquid level detector 14 and a preferably grounded work surface 400 with the liquid L extending the surface of an electrode when the capacitive liquid level detector 14 contacts the liquid L, thus causing a sudden change of the input capacitance C. The capacitive liquid level detector 14 can be fitted with a pipetting tip 14.2, so that only this pipetting tip 14.2 comes into contact with the liquid L. In this case, the capacitance between the pipetting tip 14.2 and the grounded work surface 400 is the input capacitance C. The capacitive liquid level detector 14 is fed with the clock CLK. In a preferred embodiment of the present invention this pipetting tip 14.2 is part of a pipetting device of a laboratory liquid handling apparatus.

The liquid level detection unit 10 further comprises a reference generator 12 fed with the same clock CLK, this reference generator 12 generating a control value CV, this control value CV being derived from the on/off ratio of the clock CLK as described in previous paragraphs.

The control value CV is fed into a control input 19 of a comparator 18, said comparator having a signal input 20 as well, and where the liquid detection response signal RS is fed. The comparator 18 compares the amplitude of the liquid detection response signal RS following a discharge of the input capacitance C of the capacitive liquid level detector 14 with the control value CV generated by the reference generator 12 and triggers a corresponding signal at its output 21 when the liquid detection response signal RS exceeds a threshold value TV in response to a sufficiently large change of input capacitance C of the capacitive liquid level detector 14. As described in previous paragraphs, said control value determines a control parameter of the comparator 18 such as said threshold value TV or an amplification gain at the signal input 20 of the comparator 18.

Figure 4A:
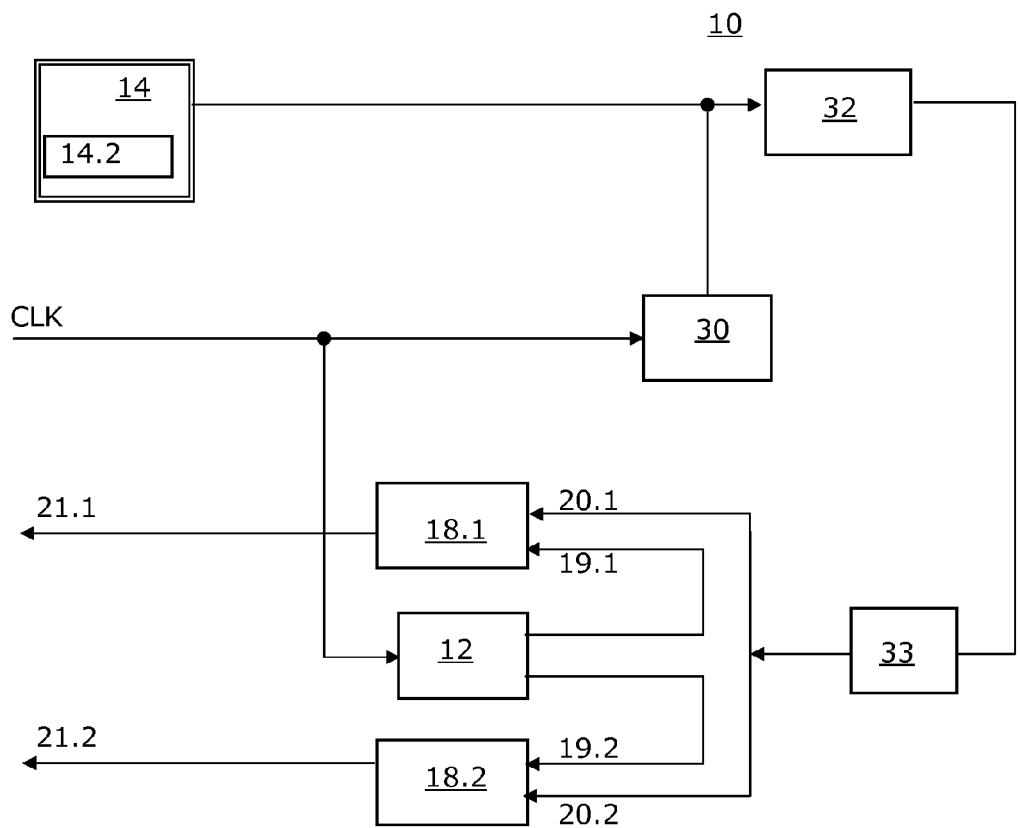
FIG. 4A Structural block diagram of a preferred embodiment of the liquid level detection unit according to the present invention, with both a dip-in output and a dip-out output.

FIG. 4A shows a structural block diagram of a particularly preferred embodiment of the liquid level detection unit 10 according to the present invention, with both a dip-in output 21.1 and a dip-out output 21.2. The reference generator 12 of this embodiment generates a control value CV determining two threshold values TV, a positive threshold value TV+ and a negative threshold value TV−. The positive threshold value TV+ will be used for Dip-In detection, i.e. when the pipetting tip 14.2 of the capacitive liquid level detector 14 comes into contact with a liquid L, and the negative threshold value TV− will be used for Dip-Out detection, i.e. when the pipetting tip 14.2 of the capacitive liquid level detector 14 stops being in contact with the liquid L. The two distinct threshold values TV, positive threshold value TV+ and negative threshold value TV− are fed into a positive threshold input 19.1 and a negative threshold input 19.2 of a dip-in comparator 18.1 and a dip-out comparator 18.2 respectively.

The dip-in comparator 18.1 and the dip-out comparator 18.2 are comparators of similar construction, with the difference that the dip-out comparator 18.2 is designed for detection of a negative pulse of the liquid detection response signal RS that falls below the negative threshold value TV−, and the dip-in comparator 18.1 is designed for detection of a positive pulse of the liquid detection response signal RS that exceeds the positive threshold value TV+. For this reason the dip-in comparator 18.1 and the dip-out comparator 18.2 comprise a signal input 20.1 and respectively a signal input 20.2 both being fed with the same liquid detection response signal RS.

The dip-in comparator 18.1 compares the amplitude of the liquid detection response signal RS following an increase of the input capacitance C of the capacitive liquid level detector 14 with the positive threshold value TV+ received on its signal input 20.1 and generated by the reference generator 12, and triggers a corresponding signal at its dip-in output 21.1 when the liquid detection response signal RS exceeds said positive threshold value TV+ in response to a sufficiently large increase of input capacitance C of the capacitive liquid level detector 14 when said pipetting tip 14.2 comes into contact with the liquid L.

The dip-out comparator 18.2 compares the amplitude of the liquid detection response signal RS following a decrease of the input capacitance C of the capacitive liquid level detector 14 with the negative threshold value TV− received on its signal input 20.2 and generated by the reference generator 12, and triggers a corresponding signal at its dip-out output 21.2 when the liquid detection response signal RS falls below said negative threshold value TV− in response to a sufficiently large decrease of input capacitance C of the capacitive liquid level detector 14 when said pipetting tip 14.2 stops contacting the liquid L.

In the preferred embodiment of the present invention shown on FIG. 4A, the clock CLK is fed to the liquid level detector 14 through a discharger 30 having an inactive and an active state, wherein in said inactive state, the input capacitance C is constantly charged and in said active state, the input capacitance C is discharged causing. This results in a charge/discharge cycle seen for the discharger function I on FIG. 1A. The active state has a predetermined length and is triggered by a rising edge of the clock signal CLK. FIGS. 1A and 2A and corresponding paragraphs of this specification describe this in more detail. The on-time and off-time of the discharger function I are different from the on-time and off-time of the clock signal CLK, but are synchronized with the clock signal CLK on the rising edge of the clock signal CLK. The variation 1, shown with a continuous line, corresponds to a lower input capacitance C, wherein the variation 2, shown with a dashed line, corresponds to a higher input capacitance C. The variation 2 corresponding to a higher capacitance C is rising less abruptly since a larger capacitance charges slower. According to the present invention, only the rising edge of the clock CLK is used for synchronization, i.e. the input capacitance C is discharged on the rising edge of the clock CLK. During the on-time, the input capacitance C of the capacitive liquid level detector 14 is discharged and since the on-time is fixed, the discharging time of the input capacitance C is also fixed. After completion of the discharge the input capacitance C of the capacitive liquid level detector 14 is discharged and a new charging cycle is started. Only the positive transition is used to trigger the fixed-time discharger pulse, therefore the on-time of the clock signal CLK does not have any impact to the discharger 30.

Figure 4B:
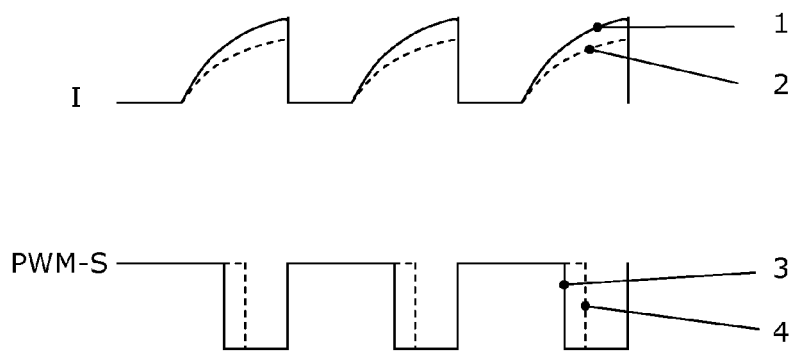
FIG. 4B Signal diagram showing the relation between the discharge function at various input capacitances and the corresponding pulse width modulation signal.

In the preferred embodiment of the present invention shown on FIG. 4A, the liquid level detection unit 10 also comprises a pulse width modulation comparator 32, said pulse width modulation comparator 32 converting the discharger function I into a pulse width modulation signal PWM-S with a duty cycle proportional to the input capacitance C. As shown on FIG. 4B, the duty cycle of the pulse width modulation signal PWM-S is always proportional to the input capacitance C, thus a higher capacitance 2 corresponds to a higher duty cycle 4, (shown with dashed lines) and a lower capacitance 1 corresponds to a lower duty cycle 3.

In a further preferred embodiment of the present invention, the liquid level detection unit 10 also comprises a filter and amplifier stage 33 positioned at the signal input 20, 20.1, 20.2 of the comparator 18, 18.1, 18.2 and fed with the pulse width modulation signal PWM-S, wherein said filter and amplifier stage 33 removes the DC component and amplifies only the voltage change resulting in a voltage pulse proportional to the capacitance change of the input capacitance C.

Figure 5A:
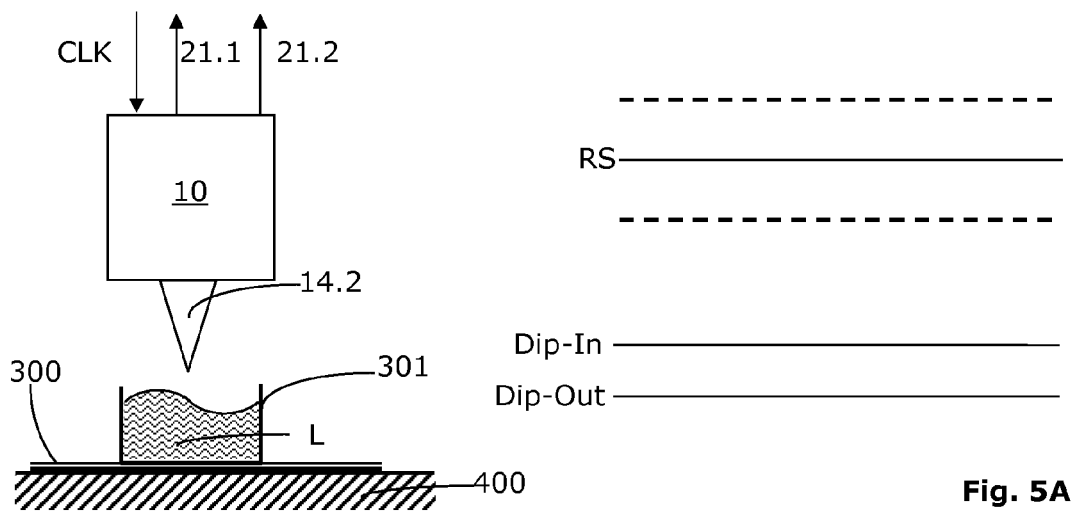
FIG. 5A Structural diagram showing the liquid level detection unit with a signal diagram alongside depicting the liquid detection input signal and the dip-in output and the dip-out output, before the liquid level detection unit comes into contact with the liquid.
Figure 5B:
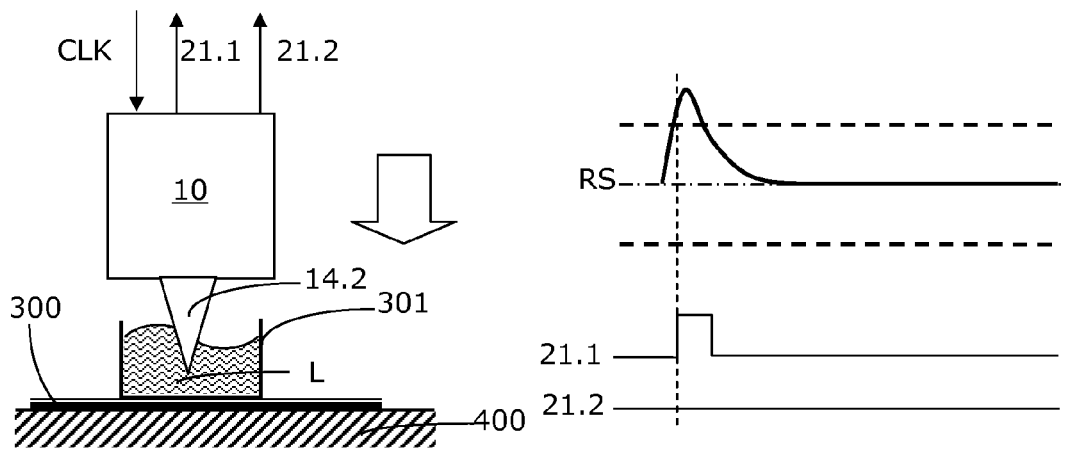
FIG. 5B Structural diagram showing the liquid level detection unit with a signal diagram alongside depicting the liquid detection input signal and the dip-in output and the dip-out output, when the liquid level detection unit comes into contact with the liquid, i.e. the dip-in phase.
Figure 5C:
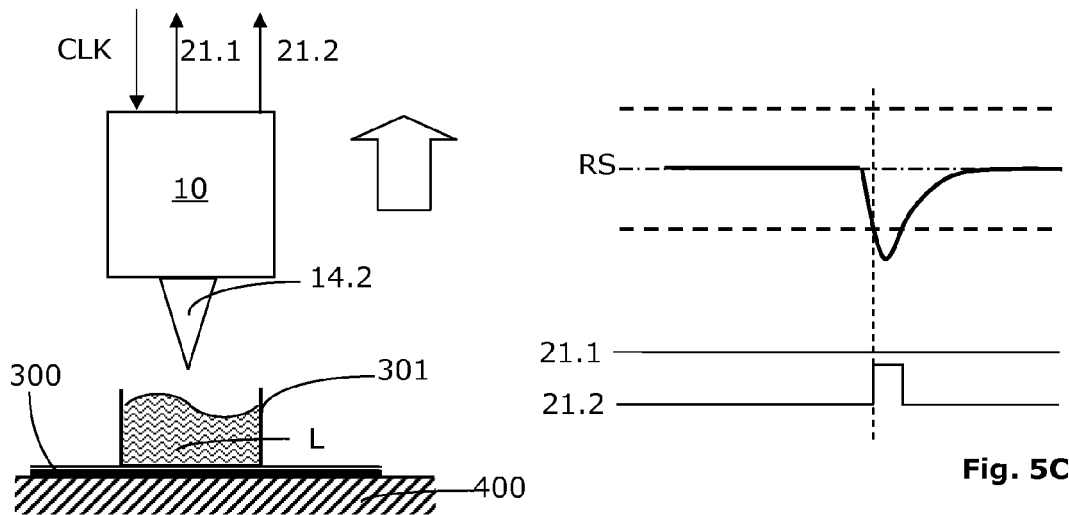
FIG. 5C Structural diagram showing the liquid level detection unit with a signal diagram alongside depicting the liquid detection input signal and the dip-in output and the dip-out output, when the liquid level detection unit stops being in contact with the liquid, i.e. the dip-out phase.

The sequence of FIGS. 5A to 5C shows the liquid level detection unit 10 in various phases of its operation with a signal diagram alongside showing the liquid detection response signal RS and the signals at the dip-in output 21.1 and the dip-out output 21.2.

FIG. 5A shows the liquid level detection unit 10 before the capacitive liquid level detector 14 comes into contact with the liquid L stored in a well 301 of a sample plate 300 placed on a work surface 400. In this case the amplitude of the liquid detection response signal RS does neither exceed the positive threshold value TV+, nor does it fall below the negative threshold value TV−. FIG. 5A shows an ideal situation where the liquid detection response signal RS is constantly 0. However, due to effects like vibration, or just simply due to the decreasing distance between the pipetting tip 14.2 and the work surface 400 there will be always some noise with a random shape not necessarily similar to the typical shape during dip-in or dip-out (shown on FIGS. 5B and 5C respectively), however, these neither exceed the positive threshold value TV+, nor fall below the negative threshold value TV−.

FIG. 5B depicts the liquid level detection unit 10 when the capacitive liquid level detector 14 comes into contact with the liquid L stored in a well 301 of a sample plate 300, i.e. the dip-in phase. The capacitive liquid level detector 14 coming into contact with the liquid L causes a sudden increase in the input capacitance C which in turn will result in a liquid detection response signal RS with an amplitude exceeding the positive threshold value TV+. The dip-in comparator 18.1 will detect this and triggers a corresponding signal at the dip-in output 21.1 indicating a "Dip-In".

FIG. 5C depicts the liquid level detection unit 10 when the capacitive liquid level detector 14 stops being in contact with the liquid L stored in a well 301 of a sample plate 300, i.e. the dip-out phase. The capacitive liquid level detector 14 retracting from contact with the liquid L causes a sudden decrease in the input capacitance C which in turn will result in a liquid detection response signal RS with an amplitude falling below the negative threshold value TV−. The dip-out comparator 18.2 will detect this and triggers a corresponding signal at the dip-out output 21.2 indicating a "Dip-Out".

Figure 6A:
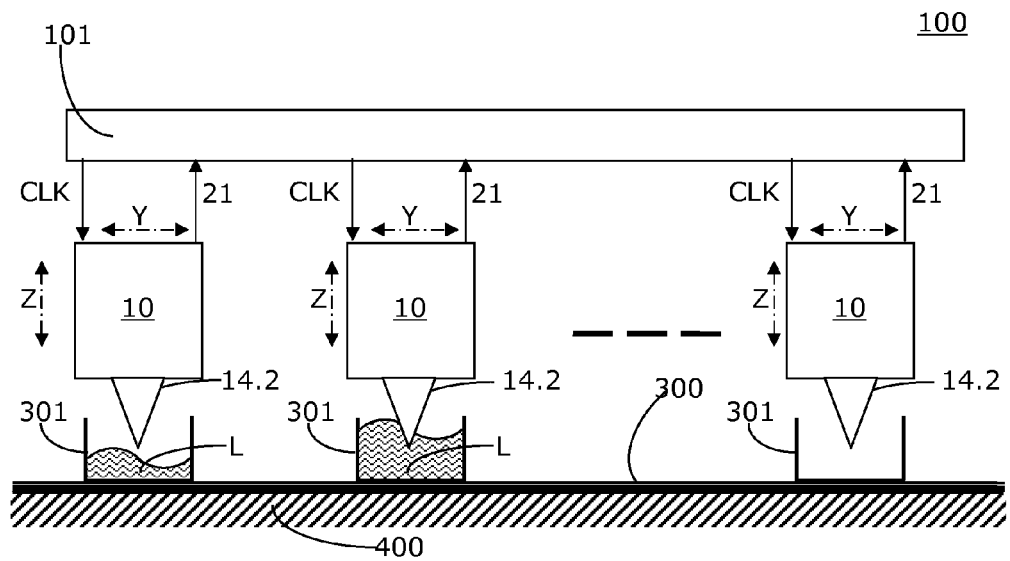
FIG. 6A Structural side view showing a multi-channel liquid level detection system comprising multiple liquid level detection units mounted on a single arm, in the dip-in phase.

FIG. 6A shows a structural side view of a multi-channel liquid level detection system 100, comprising multiple liquid level detection units 10, in the dip-in phase. According to a preferred embodiment of the present invention, the multiple liquid level detection units 10 are mounted on a single y-axis module also called y-axis arm 101. In a liquid handling laboratory setup, each liquid level detection unit 10 corresponds to a so-called pipetting channel or z-axes, with a corresponding well 301 in a sample plate 300.

Figure 6B:
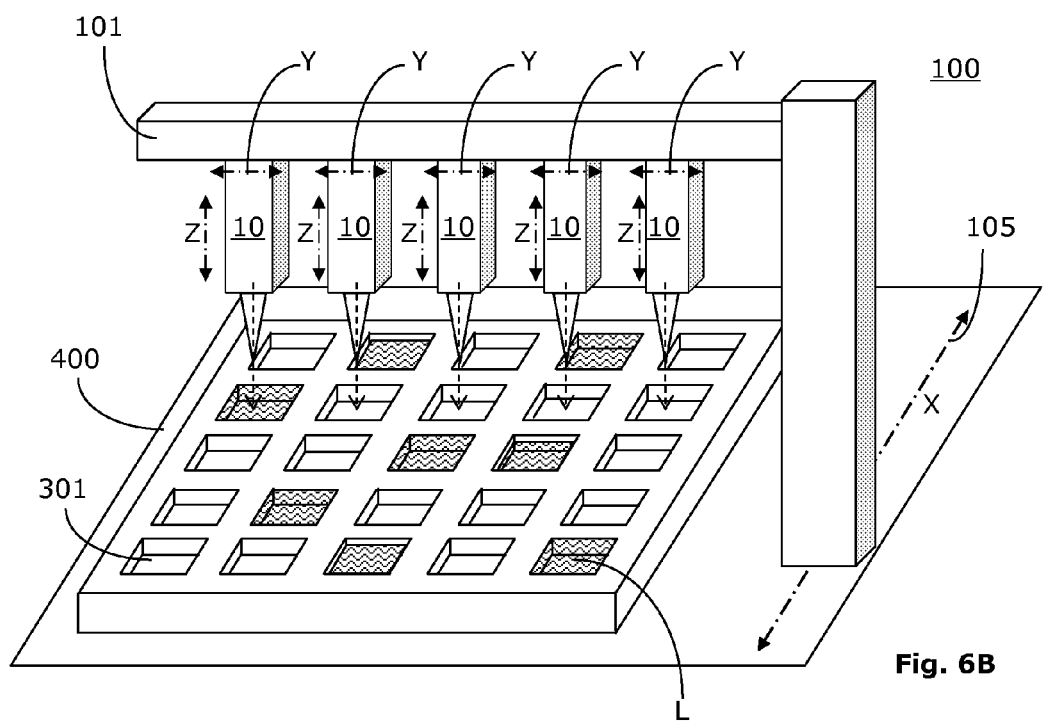
FIG. 6B Structural perspective view of a multi-channel liquid level detection system comprising multiple liquid level detection units mounted on a single arm, showing multiple axes of the system and the sample plate.

FIG. 6B depicts a perspective view of a multi-channel liquid level detection system 100 comprising multiple liquid level detection units 10 showing multiple axes of the multi-channel liquid level detection system 100 and the sample plate 300 with an array of wells 301 placed on a grounded work surface 400. The proximity of the liquid level detection units 10, which is the reason why possible interferences have to be addressed, can be well seen on this figure. The embodiment shown on FIG. 6B has several liquid level detection units 10 mounted on an y-axis arm 101 which is carried by an x-axis arm 105. Each liquid level detection unit 10 has an individual y-axis and an individual z-axis as well, thus an individual capacitive liquid level detector 14 is needed since each liquid level detection units 10 is operated individually. The multi-channel liquid level detection system 100 is to be operated as follows:

a)—the sample plate 300 with the array of 301s is placed on the grounded work surface 400 below the multi-channel liquid level detection system 100;

b)—a particular row of the array of wells 301 is selected by moving the x-axis arm 103 along the x axis until the y-axis arm 101 is above the desired row;

c)—particular wells 301 are selected by displacing the individual liquid level detection units 10 along their y-axis d)—one or more individual liquid level detection units 10 are displaced along their Z-axis until the tips 14.2 of said liquid level detection units 10 dive in corresponding wells 301;

e)—retracting the tips 14.2 of the respective liquid level detection units 10 from the wells 301 by displacing the individual liquid level detection units 10 in the opposite direction along their Z-axis;

f)—repeating steps b) to e) for each row of the array of wells 301 which needs to be processed;

g)—storage and/or analysis of the signals from the output 21 of each liquid level detection unit 10 for each sequence of steps b) to d) corresponding to each row of the array.

Figure 7:
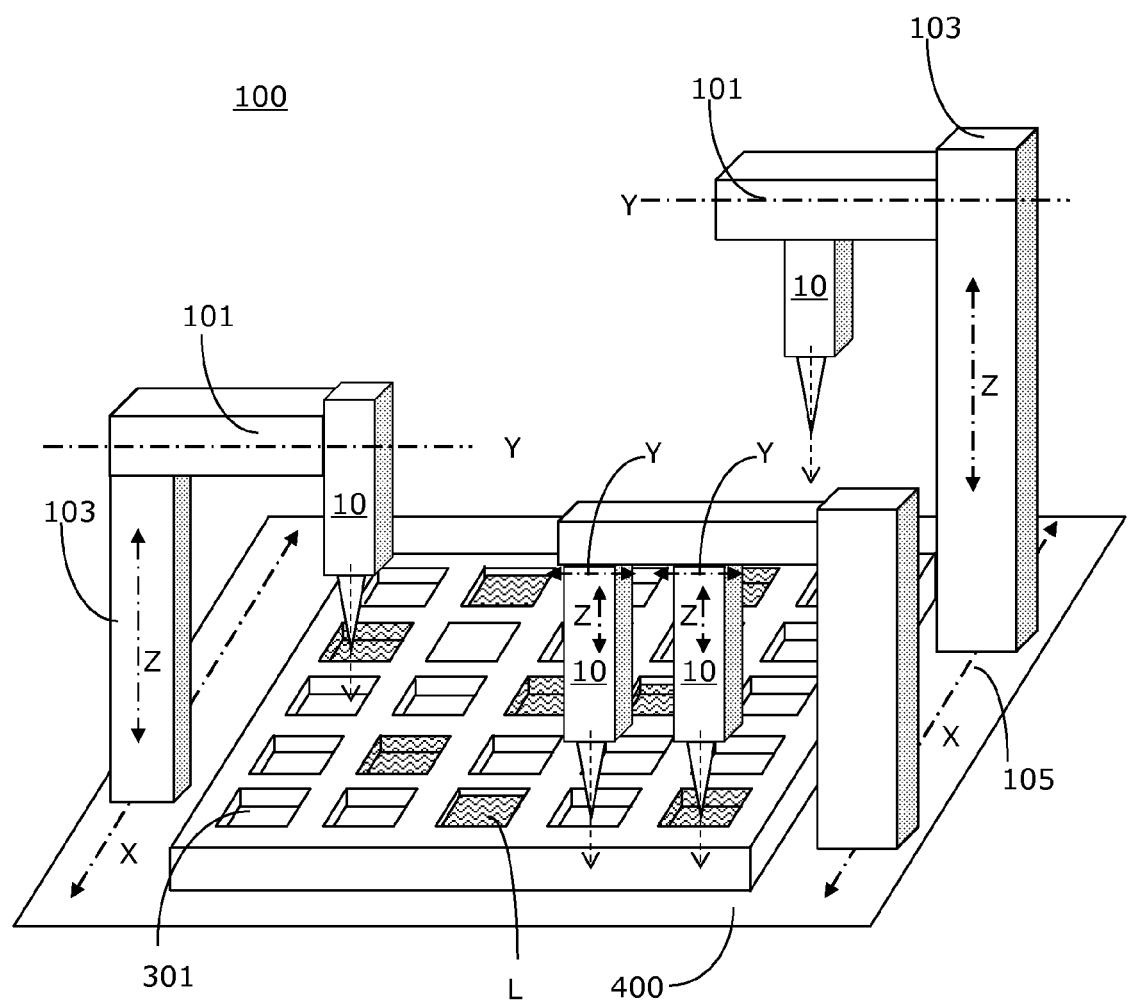
FIG. 7 Structural perspective view of a multi-channel liquid level detection system comprising multiple liquid level detection units mounted on different arms of multiple axes of the system.

FIG. 7 shows a structural perspective view of a multi-channel liquid level detection system 100 comprising multiple liquid level detection units 10 mounted on different arms of multiple axes of the system. In such an arrangement, the further advantages of the present invention are apparent, wherein synchronization of the multiple liquid level detection units 10 mounted on different arms would introduce difficulties due to wiring constraints and possibly the requirement of having different sensitivities for each liquid level detection unit 10. On this figure, a single multiple liquid level detection unit 10 is mounted on each of the multiple y-axis arms 101, each y-axis arm 101 being carried by an in individual z-axis arm 103. The z-axis arms 103 can be mounted either on individual or common x-axes carriages.

In an even further embodiment, each of the multiple liquid level detection units 10 of a multi-channel liquid level detection system 100 could be mounted on an individually freely controllable robotic arm wherein the same concept of the present invention is applied, i.e. both the sensitivity and the threshold values TV are commonly regulated by the respective clock signals CLK for each liquid level detection unit 10.

It will be understood that many variations could be adopted based on the specific structure hereinbefore described without departing from the scope of the invention as defined in the following claims.

Reference List:

| | |
|---|---|
| liquid level detection unit | 10 |
| reference generator | 12 |
| capacitive liquid level detector | 14 |
| pipetting tip | 14.2 |
| comparator | 18 |
| control input | 19 |
| signal input | 20 |
| output | 21 |
| dip-in comparator | 18.1 |
| positive threshold input | 19.1 |
| signal input | 20.1 |
| dip-in output | 21.1 |
| dip-out comparator | 18.2 |
| negative threshold input | 19.2 |
| signal input | 20.2 |
| dip-out output | 21.2 |
| discharger | 30 |
| pulse width modulation comparator | 32 |
| filter and amplifier stage | 33 |
| multi-channel liquid level detection system | 100 |
| y-axis arm | 101 |
| z-axis arm | 103 |
| x-axis arm | 105 |
| sample plate | 300 |
| well | 301 |
| work surface | 400 |
| input capacitance | C |
| liquid detection response signal | RS |
| Discharger Function | I |

| | |
|---|---|
| Pwm Signal | PWM-S |
| Clock | CLK |
| Control Value | CV |
| Threshold Value | TV |
| Positive Threshold Value | TV+ |
| Negative Threshold Value | TV− |
| Liquid | L |

The invention claimed is:

1. Method for liquid level detection with a liquid level detection unit (10) with a capacitive liquid level detector (14) with an input capacitance (C), said input capacitance (C) changing if the capacitive liquid level detector (14) contacts a liquid, the method comprising the following steps:
- generation of a clock signal (CLK) with a preset on-time (t1) corresponding to a preset sensitivity of the capacitive liquid level detector (14);
- feeding said clock signal (CLK) both to a reference generator (12) and to the capacitive liquid level detector (14);
- said reference generator (12) generating a control value (CV), derived from an on/off ratio of said clock signal (CLK) and feeding said control value (CV) into a control input (19) of a comparator (18);
- feeding a liquid detection response signal (RS), of said capacitive liquid level detector (14) in response to said change of the input capacitance (C), into a signal input (20) of the comparator (18);
- said control value (CV) determining a control parameter of the comparator (18);
- said comparator (18) triggering an output signal at an output (21) when said liquid detection response signal (RS) of the capacitive liquid level detector (14) exceeds a threshold value (TV) in response to a change of the input capacitance (C) of the capacitive liquid level detector (14).

2. A method for liquid level detection according to claim 1, characterized in that said control parameter is an amplification gain of the signal input (20) of the comparator (18) and/or the threshold value (TV) of the comparator (18).

3. A method for liquid level detection according to claim 1, characterized in that
- said comparator (18) comprises a Dip-In comparator (18.1) and a Dip-Out Comparator (18.2);
- said reference generator (12) generating a positive threshold value (TV+) and a negative threshold value (TV−), both derived from said on/off ratio of said clock signal (CLK) and feeding said positive threshold value (TV+) into a positive threshold input (19.1) of the Dip-In comparator (18.1) and feeding said negative threshold value (TV−) into a negative threshold input (19.2) of the Dip-Out comparator (18.2);
- said Dip-In comparator (18.1) triggers an output signal at a Dip-In output (21.1) when said liquid detection response signal (RS) of the capacitive liquid level detector (14) positively exceeds said positive threshold value (TV+) in response to an input capacitance (C) increase of said capacitive liquid level detector (14);
- said Dip-Out comparator (18.2) triggers an output signal at a Dip-Out output (21.2) when said liquid detection response signal (RS) of the capacitive liquid level detector (14) falls below said negative threshold value (TV−) in response to an input capacitance (C) decrease of said capacitive liquid level detector (14).

4. A method for liquid level detection according to claim 1, characterized in that said clock signal (CLK) is fed to the capacitive liquid level detector (14) through a discharger (30), said discharger (30) having an inactive and an active state, wherein in said inactive state, the input capacitance (C) is constantly charged and in said active state, the input capacitance (C) is discharged and wherein said active state has a predetermined length and is triggered by a rising edge of the clock signal (CLK).

5. A method for liquid level detection according to claim 1, characterized in that said change in input capacitance (C) is due to a pipetting tip (14.2) of said capacitive liquid level detector (14) coming into contact with said fluid, thus changing the input capacitance (C).

6. A method for liquid level detection according to claim 4, characterized in that said capacitive liquid level detector (14) comprises a pipetting tip (14.2) for contacting said liquid acting as a surface enlargement of a capacitance electrode, thus changing the input capacitance (C) of the capacitive liquid level detector (14).

7. A method for liquid level detection according to claim 1, characterized in that a discharger function (I) of the capacitive liquid level detector (14) is fed into a pulse width modulation comparator (32), said pulse width modulation comparator (32) converting the discharger function (I) into a pulse width modulation signal (PWM-S) with a duty cycle proportional to the input capacitance (C), said pulse width modulation signal (PWM-S) being filtered and amplified by a filter and amplifier stage (33), wherein said filter and amplifier stage (33) removes a direct current component and amplifies a voltage change resulting in a voltage pulse in the filtered and amplified liquid detection response signal (RS) proportional to the capacitance change of the input capacitance (C).

8. A method for liquid level detection according to claim 1, characterized in that multiple liquid level detection units (10) are mounted in relative proximity, wherein in order to prevent interferences between liquid level detection units (10), each liquid level detection unit (10) is fed with a different clock signal (CLK) at different frequencies, each clock signal (CLK) having a predetermined on time (t1) corresponding to a predetermined sensitivity of the respective capacitive liquid level detector (14), and wherein variations in the sensitivity of the capacitive liquid level detectors (14) of each liquid level detection unit (10) caused by differences in the clock signal (CLK) frequencies are self-compensated by feeding each comparator (18) of each liquid level detection unit (10) with different control values (CV) generated by the reference generator (12) of each liquid level detection unit (10) based on said different clock signals (CLK).

9. A liquid level detection unit (10) for capacitive liquid level detection comprising:
- a capacitive liquid level detector (14) with an input capacitance (C) and fed with a clock signal (CLK) with a preset on-time (t1) corresponding to a preset sensitivity of the capacitive liquid level detector (14), said input capacitance (C) changing if at least a portion of the capacitive liquid level detector (14) contacts a liquid;
- a reference generator (12) fed with the clock signal (CLK), said reference generator (12) generating a control value (CV), derived from an on/off ratio of said clock signal (CLK);
- a comparator (18) with a control input (19) fed with said control value (CV), said control value (CV) determining a control parameter of the comparator (18);
- wherein a signal input (20) is fed with a liquid detection response signal (RS) of said capacitive liquid level detector (14) in response to said changes in the input capacitance (C); said comparator (18) triggering an output signal at an output (21) when said liquid detection response signal (RS) of the capacitive liquid level detector (14) exceeds a threshold value (TV) in response to a change of the input capacitance (C).

10. A liquid level detection unit (10) according to claim 9, characterized in that said control parameter is an amplification gain of the signal input (20) of the comparator (18) and/or the threshold value (TV) of the comparator (18).

11. A liquid level detection unit (10) according to claim 10, characterized in that:
- said comparator (18) comprises a Dip-In comparator (18.1) and a Dip-Out Comparator (18.2);
- said reference generator (12) generates a positive threshold value (TV+) and a negative threshold value (TV−), both derived from said on/off ratio of said clock signal (CLK);
- said positive threshold value (TV+) is fed into a positive threshold input (19.1) of the Dip-In comparator (18.1);
- said negative threshold value (TV−) is fed into a negative threshold input (19.2) of the Dip-Out comparator (18.2);
- said Dip-In comparator (18.1) triggers an output signal at a Dip-In output (21.1) when said liquid detection response signal (RS) of the capacitive liquid level detector (14) positively exceeds said positive threshold value (TV+) in response to a input capacitance change of said capacitive liquid level detector (14);
- said Dip-Out comparator (18.2) triggers an output signal at a Dip-Out output (21.2) when said liquid detection response signal (RS) of the capacitive liquid level detector (14) falls below said negative threshold value (TV−) in response to a change of input capacitance (C) said capacitive liquid level detector (14).

12. A liquid level detection unit (10) according to claim 9, characterized in that it further comprises a discharger (30) being positioned before the capacitive liquid level detector (14) and thus being fed with said clock signal (CLK), said discharger (30) having an inactive and an active state, wherein in said inactive state, the input capacitance (C) is constantly charged and in said active state, the input capacitance (C) is discharged and wherein said active state has a predetermined length and is triggered by a rising edge of the clock signal (CLK).

13. A liquid level detection unit (10) according to claim 9, characterized in that said change in input capacitance (C) is due to a pipetting tip (14.2) of said capacitive liquid level detector (14) coming into contact with said fluid, thus changing the input capacitance (C).

14. A liquid level detection unit (10) according to claim 13, characterized in that said capacitive liquid level detector (14) comprises a pipetting tip (14.2) for contacting said liquid acting as a surface enlargement of a capacitance electrode, thus changing the input capacitance (C) of the capacitive liquid level detector (14).

15. A liquid level detection unit (10) according to claim 9, characterized in that it further comprises a Pulse Width Modulation comparator (32) positioned before said signal input (20) of the comparator (18), said pulse width modulation comparator (32) converting a discharger function (I) of the capacitive liquid level detector (14) into a pulse width modulation signal (PWM-S) with a duty cycle proportional to the input capacitance (C) said pulse width modulation signal (PWM-S) being filtered and amplified by a filter and amplifier stage (33), wherein said filter and amplifier stage (33) removes a direct current component and amplifies a voltage change resulting in a voltage pulse in the filtered and amplified liquid detection response signal (RS) proportional to the capacitance change of the input capacitance (C).

16. A multi-channel liquid level detection system (100) comprising multiple liquid level detection units (10) according to claim 9 characterized in that said multiple liquid level detection units (10) are mounted in relative proximity, wherein in order to prevent interferences between liquid level detection units (10), each liquid level detection unit (10) is fed with a different clock signal (CLK) at different frequencies, each clock signal (CLK) having a preset on time (t1) corresponding to a preset sensitivity of the respective capacitive liquid level detector (14), and wherein variations in the sensitivity of the capacitive liquid level detectors (14) of each liquid level detection unit (10) caused by differences in the clock signal (CLK) frequencies are self-compensated by feeding each comparator (18) of each liquid level detection unit (10) with different control values (CV) generated by the reference generator (12) of each liquid level detection unit (10) based on said different clock signals (CLK).

* * * * *